United States Patent [19]

Wettengel et al.

[11] Patent Number: 5,789,701
[45] Date of Patent: Aug. 4, 1998

[54] DROP CABLE

[75] Inventors: Paul Frederick Wettengel, Martlesham Heath; Peter David Jenkins, Woodbridge, both of England

[73] Assignee: British Telecommunictions public limited company, London, United Kingdom

[21] Appl. No.: 688,554

[22] PCT Filed: Dec. 1, 1989

[86] PCT No.: PCT/GB89/01438

§ 371 Date: Jun. 25, 1991

§ 102(e) Date: Jun. 25, 1991

[87] PCT Pub. No.: WO90/07138

PCT Pub. Date: Jun. 28, 1990

[30] Foreign Application Priority Data

Dec. 1, 1988 [GB] United Kingdom ............. 8828082
Dec. 1, 1988 [GB] United Kingdom ............. 8828099

[51] Int. Cl.⁶ .................................................. H01B 7/18
[52] U.S. Cl. .................... 174/41; 174/40 R; 174/43; 385/113; 254/134.3 R; 254/134.4
[58] Field of Search ........................ 174/41, 40 R, 174/40 TD, 42, 43, 45 TD, 45 R, 70 A; 52/40; 248/58, 64; 385/113, 103; 254/134.3 R, 134.4

[56] References Cited

U.S. PATENT DOCUMENTS

| | | | |
|---|---|---|---|
| 2,121,478 | 6/1938 | Dorman | 174/40 TD |
| 3,063,860 | 11/1962 | Gemmer | |
| 4,195,192 | 3/1980 | Hackney et al. | 174/40 R |
| 4,409,429 | 10/1983 | Gaylard | 174/43 |
| 4,686,325 | 8/1987 | Marsico et al. | 174/40 |
| 4,695,677 | 9/1987 | Ruth et al. | 174/45 TD |
| 4,832,442 | 5/1989 | Pappas | 174/141 |
| 4,892,442 | 1/1990 | Shaffner | 405/154 |

FOREIGN PATENT DOCUMENTS

| | | | |
|---|---|---|---|
| 69 485 | of 0000 | European Pat. Off. | |
| 8303494 | 10/1983 | European Pat. Off. | 174/70 A |
| 0108590 | 5/1984 | European Pat. Off. | |
| 939 050 | of 0000 | France | |
| 0799112 | 6/1936 | France | 174/40 TD |
| 3 031 833 | of 0000 | Germany | |
| 3 232 566 | of 0000 | Germany | |
| 2 580 089 | of 0000 | United Kingdom | |

OTHER PUBLICATIONS

Philips Telecommunication Review, vol. 46, No. 1, 1988, Hilversum NL pp. 14–28, R. Herff: 'optoflex optical overhead cable for use on high–power lines'.

Journal of Lightwave Technology, vol. 6, No. 2, 1988, New York US pp. 186–190, S. Tomita: 'suppression of galloping oscillation for a self-supporting opticl fibre c cable'.

Bell Laboratories, "Undulated Core Makes Self–Supporting Cable Practical", Nov. 1964, Electronic Industries, p. 28.

Ishihara et al., "New Self–Supporting Cable for Overhead Subscriber Distribution Use", Apr. 1980, Japanese Telecommunications Review, vol. 22, No. 2, pp. 135–140.

Primary Examiner—Hyung S. Sough
Attorney, Agent, or Firm—Nixon & Vanderhye

[57] ABSTRACT

A drop cable arrangement in which a carried line (9) is supported by a strength member (3), the carried line being attached to the strength member via a tubular member (7) that is a sufficiently loose fit around the strength member to permit relative longitudinal movement therebetween. In the event of additional loading on the drop cable the strength member extends due to the increased tension, but this tension is not transferred to the carried line due to the permitted relative movement of the tubular member and strength member.

29 Claims, 2 Drawing Sheets

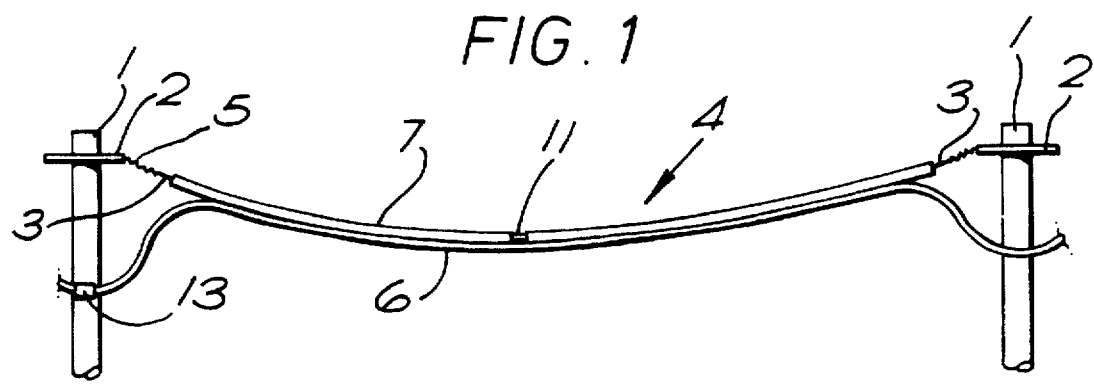
FIG. 1
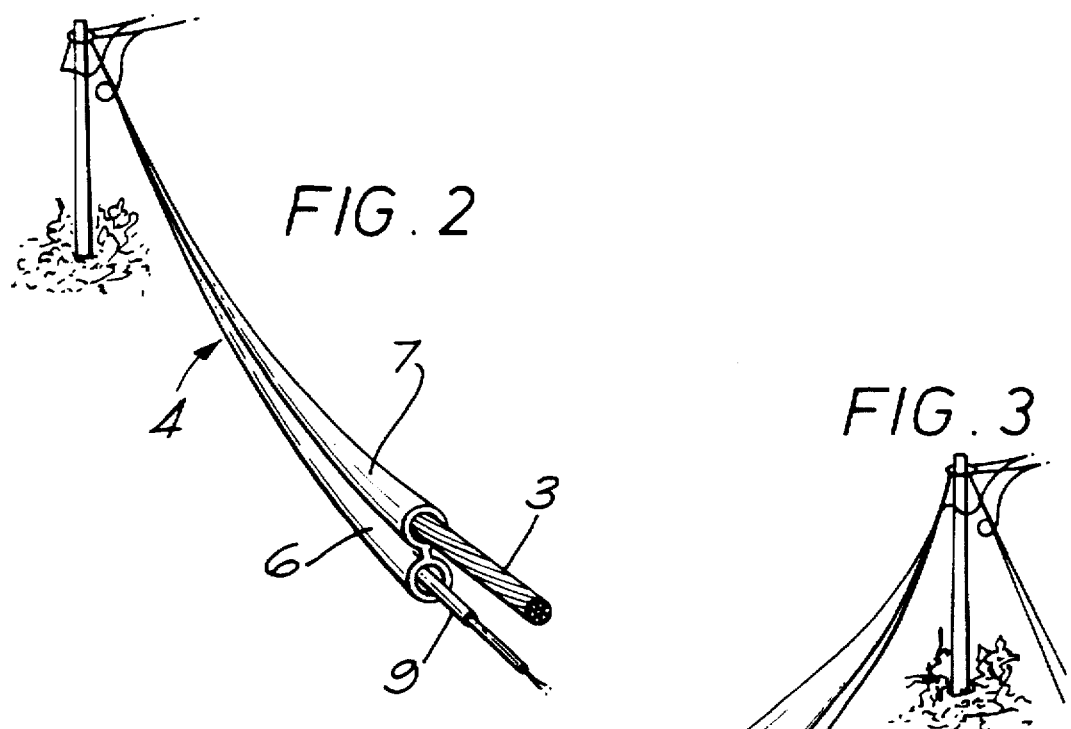
FIG. 2
FIG. 3
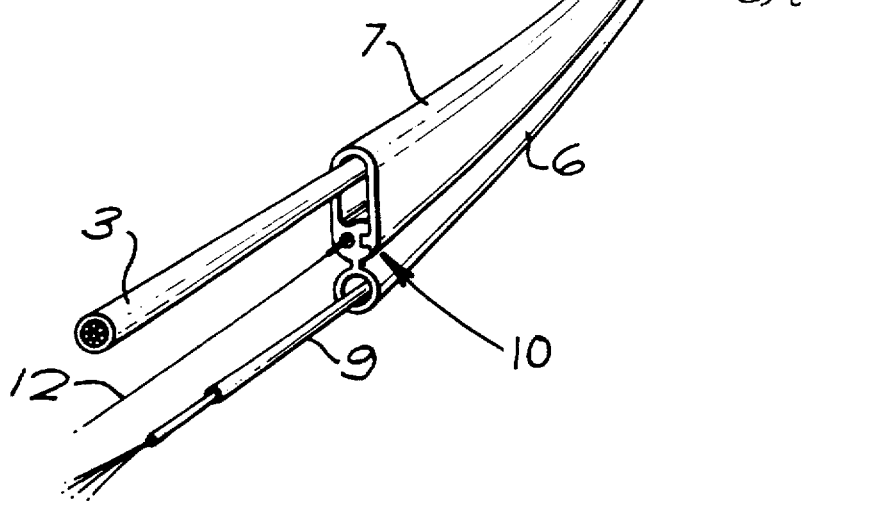

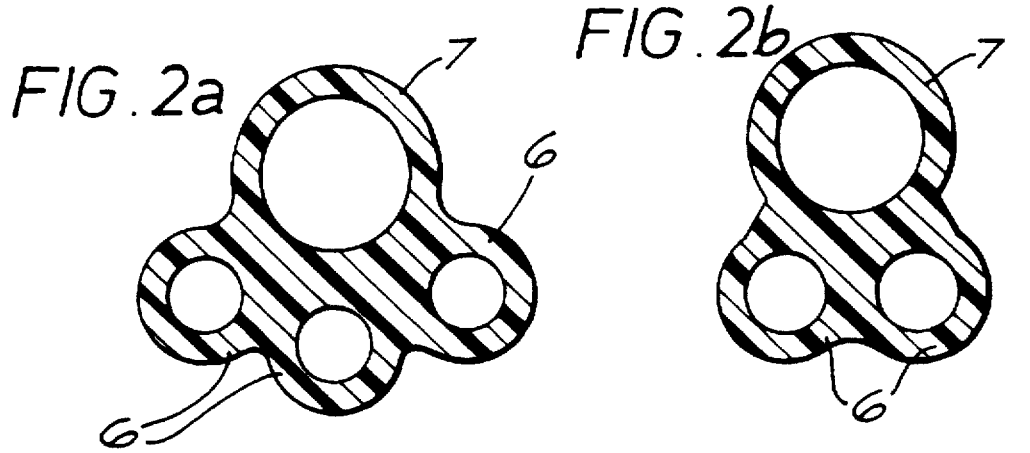
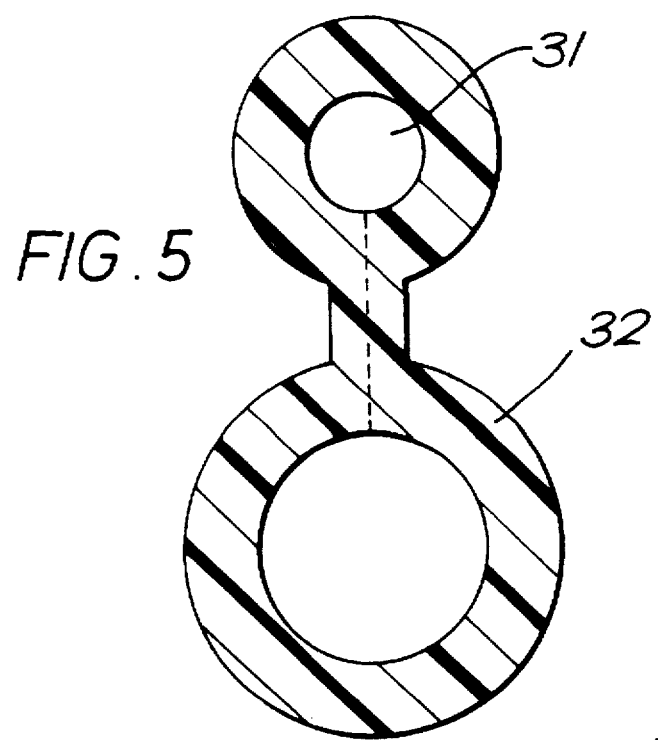
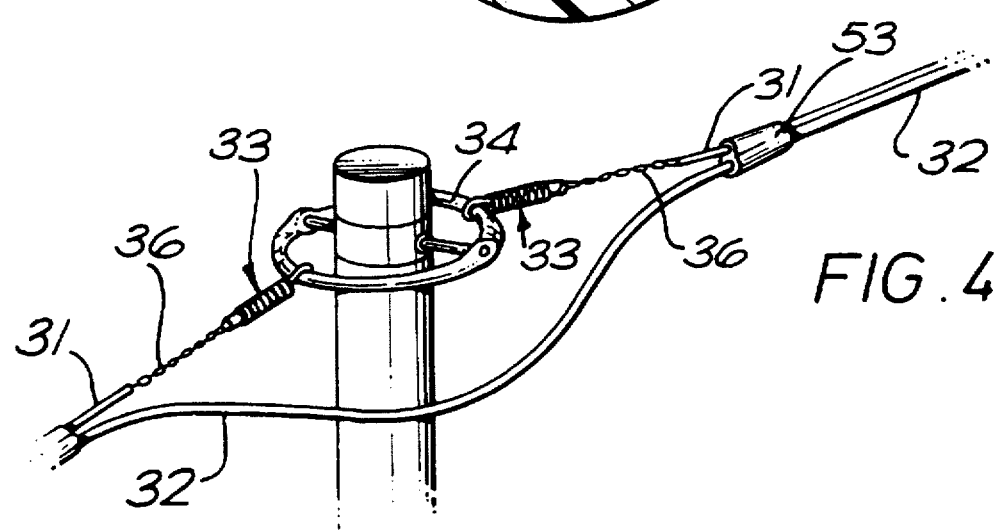

DROP CABLE

BACKGROUND OF THE INVENTION

1. Field of the Invention

This invention relates to suspended cables and the like, and in particular but not exclusively to suspended transmission lines.

2. Description of Related Art

For above ground routes, a cable, known in this context as a drop cable, may be suspended from poles so that the cable hangs between each adjacent pair of poles in a catenary. Typically, a drop cable comprises a strength member made of tensile steel which supports the load, and a carried member, which may for example be a more delicate transmission line or lines. The carried member is attached, either continually or at intervals, to the strength member. For transmission lines, the typical distance between poles is 200 feet, that is 69 metres. Between the poles, the drop cable sags due to its own weight, the extent of the sag on installation being determined by the tension in the drop cable, and being designed to be within a range of values determined by the acceptable drop cable tension and the acceptable extent of eventual sag to avoid hazard. In addition to the suspension load of the weight of the drop cable itself, an externally-mounted drop cable is subject to additional variable loading due to wind force and settling of moisture or ice formation. This additional loading results in strain in the drop cable which will affect all the elements of the cable including the carried line(s).

Optical fibre or other lightweight transmission lines may be conveniently installed in a previously-suspended drop cable the strength member of which supports a duct along which a lightweight package can be installed by the technique known as fibre blowing, this technique being described in our European Patent specification No. 108590.

This technique involves blowing compressed fluid, usually gas, along a duct into which the transmission line is to be installed, and feeding the transmission line into the duct at the same time, so that it is urged along by the viscous drag of the fluid flow. A particular feature of this technique is that it enables sensitive transmission lines, especially those containing optical fibres, to be installed after the laying, or suspending, of the duct, and the transmission line is, therefore, free from any stress resulting from installation or suspension of the duct itself. Alternatively, the carried line may be lashed to a previously-suspended strength member, but this is less convenient. However, even if a transmission line is installed after suspension of the strength member, it is in present systems still subjected to the additional, variable strains resulting from ice and/or wind loading on the drop cable.

SUMMARY OF THE INVENTION

An aim of the invention is to provide a convenient means for suspending a carried member from a strength member in a catenary and to inhibit environmentally-produced strain on sensitive elements. Another aim is to provide a means for reducing the strain experienced by sensitive elements in a catenary system.

The present invention provides a drop cable arrangement for a catenary, the arrangement comprising a tensile, load-supporting, strength member, a carried member, and a tubular member supporting the carried member, the strength member being mounted within the tubular member, and the tubular member being of a sufficient internal size to enable relative longitudinal movement between the strength member and the tubular member.

The invention also provides a drop cable arrangement for a catenary, the arrangement comprising a tensile, load-supporting, strength number and a carried member, wherein an elastic linkage is provided in the strength member, the elastic linkage having an extension rate per unit length substantially greater than the extension rate of the strength member, and wherein the carried member is provided with sufficient slack to take up the extension of the elastic linkage without strain.

BRIEF DESCRIPTION OF THE DRAWING

The invention will now be described, by way of example, with reference to the accompanying drawings in which:

FIG. 1 schematically illustrates a first embodiment of the invention;

FIG. 2 schematically illustrates part of the first embodiment;

FIGS 2a and 2b depict alternate exemplary embodiments;

FIG. 3 schematically illustrates a second embodiment of the invention;

FIG. 4 schematically illustrates a third embodiment of the invention; and

FIG. 5 is a cross-section through a simple drop cable for use with the third embodiment of the invention.

DESCRIPTION OF PREFERRED EMBODIMENTS

Referring to FIG. 1, a catenary system comprises poles 1 which each have a connection ring 2 to which a tensile load supporting strength member 3 of a drop cable 4 is attached via a connection stopper member 5. Alternative means for attaching the strength member 3 to the poles 1 may be utilised, the arrangement shown being typical of presently used transmission line attachments. The strength member 3 supports a carried member 6. A tubular member 7, which may be made integrally with the carried member 6 or attached to it by other means, extends around the strength member (more clearly seen by reference to FIGS. 2 and 3) and is sufficiently loose to enable relative longitudinal movement between the tubular member and the strength member. Prior to attachment of the strength member 3 to a pole 1, the carried member 6 separates from the strength member and is left slack as it bypasses the pole, and then rejoins the strength member of the next span after its attachment to the pole. In an external suspended drop cable system there are initial loading and tension factors which are determined by the drop cable weight and the selected installation tension, and superimposed on this there are changes in loading due to factors such as ice and wind. Typical values may be a total drop cable weight of 0.3 to 0.5 Newtons per metre run, but environmental loading (caused for example by a cladding of ice to a thickness of 5 mm and the ice clad cable being subjected to wind loading) may increase the weight respectively by up to 2 to 3 and 5 to 6 Newtons per metre run. Thus, the environmental loading may greatly exceed the cable weight loading, and the increased load imposes increased tension and consequent elongation in the suspended cable. The total loading on a cable is given by:

$$\sqrt{(\text{ice clad weight}^2 + \text{wind load}^2)}$$

and for the values mentioned above strains of the order of 0.3% or greater are experienced, the precise value depending on the cross-sectional size and the Youngs Modulus of the strength member 3. Strains of this extent cannot be tolerated in delicate transmission lines such as those containing optical fibres.

With the arrangement shown in FIG. 1, it can be assumed that the load of the complete drop cable 4 is taken by the strength member 3. When the load increases, the strain is solely experienced by the strength member 3 because the tubular member 7 slides upon the strength member by virtue of its loose fit and the tubular member's resistance to relative movement with respect to the strength member being less than its own resistance to extension. The slack in the carried member 6 is sufficient to take up the extension of the strength member 3 without strain. Thus, the tubular member 7, and any line carried within it, remain substantially free from environmentally induced strain, thereby enabling elements that are sensitive to strain such as optical fibres or other delicate transmission lines, to be carried in a drop wire system.

Referring now in more detail to FIG. 2, the drop cable 4 comprises two side-by-side passageways constituting the carried member 6 and tubular member 7. As shown, the two passageways are of equal size, but it is possible for them to differ in size or for more passageways to be provided, as shown for example in FIGS. 2a and 2b. Conveniently, the passageways may be formed by an integral plastics extrusion of side-by-side tubes. The strength member 3 passes along the passageway constituting the tubular member 7, this being normally achieved by threading the strength member through the passageway, although forming The passageway around the strength member may also be possible. The passageway constituting the carried member 6 supports a transmission line 9 which, when installed, also forms part of the carried line. The line 9 may be installed in this passageway prior to, or after, installation of the catenary. In the case of lightweight transmission lines, and especially those containing optical fibres, it is convenient to install the line 9 in its passageway by the fibre blowing technique described in EP108590, and this technique is conveniently utilised after suspension of the drop cable 4 in the catenary.

To enhance blowability when using a fibre blowing technique, and for long term retention of good blowing characteristics, it is convenient to use a lubricant-impregnated plastic for the drop cable 4. It may not be possible to obtain good blowability and the mechanical properties desired for the drop cable 4 from a single plastics material or from a blend of plastics materials. Optimum, or more nearly optimum properties, can be achieved if the passageway constituting the carried member 6 is lined with a different plastics material from that used for the rest of the drop cable structure. The lining and the drop cable structure may be formed simultaneously, or almost simultaneously, using a co-extrusion or series extrusion process respectively. Alternatively, the lining of the passageway constituting the carried member 6 may be formed in a first operation, the remainder of the drop cable body being formed subsequently (minutes, hours or days later as appropriate) by extrusion about the lining. High density polyethylene (HDPE) is a preferred lining material. Particularly preferred is HDPE incorporating a solid lubricant such as antistatic grade carbon. A concentration in the range of 5% to 10% antistatic grade carbon is preferred, most preferably 8%. Typical co-extrusion rates are of the order of 10 metres per minute. Where the lining is co-extruded, it will typically be 0.2 to 0.5 mm in thickness, more typically 0.25 to 0.35 mm. Where the lining is produced other than in a co-extrusion process, the lining wall thickness may preferably be somewhat greater, for example up to 1 mm.

Typical internal diameters for the passageway constituting the carried member 6 are in the range 3 to 7 mm, preferably 5 to 6 mm. These dimensions are particularly suitable for use of fibre blowing processes for installation of transmission lines such as suitably packaged multimode or monomode optical fibres.

In FIG. 3, a modified tubular member 7 is illustrated which has an openable side to enable the tubular member to be engaged around a strength member 3 where threading is not convenient. This has applicability to retrofitting around a previously suspended line (which may be a strength member only or a drop cable including a strength member) where access to the ends is not available. In the embodiment shown, the side of the tubular member 7 is openable by virtue of a parting line at the base of the right hand side (as viewed) and the natural resilience of the material of the tube effectively forming a hinge at the top of the tubular member. The confronting sides of the parting line are provided with a cooperating ball and cup catch 10.

As previously mentioned, it is necessary for the resistance of the tubular member 7 to extension to be less than the sliding resistance which enables the strength member 3 to expand without stretching the tubular member. To this end, it is desirable to incorporate means to reduce the possibility of the strength member 3 becoming caught, or otherwise stuck in the tubular member 7. In general, the strength member 3 will be made of a corrosion-resistant material such as stainless steel, which may be further coated or oiled (for example silicone oiled) to ease friction between the strength member and the tubular member 7, and/or further aid corrosion resistance. Low friction coatings, such as silicone or polytetrafluoroethylene may also be utilised for the inside surface of the tubular member 7, which in general will comprise a plastics material. A potential source of sticking is icing of the strength member 3 within the tubular member 7. To reduce the possibility of this happening, vents 11 (FIG. 1) may be provided at the low point of each catenary span, the vents enabling egress of water from the tubular member 7. In the vicinity of the vents 11, drip beads may be provided to aid channelling of drips away from contact with the strength member 3 and the tubular member 7. Anti-wetting agents and/or low friction coating inside the tubular member aid(s) the egress of water. Drip beads or other formations may also be used to discourage entry of water, either directly or by running along the strength member 3, into the tubular member 7 at its open ends. Additional strain resistance may be provided by including at least one auxiliary strength member 12 (see FIG. 3) in the wall of the tubular member 7. Preferably, the auxiliary strength member 12 is made of polyaramide, is extruded into a plastics tubular member, and also provides resistance to temperature-induced strain by virtue of its negative coefficient of thermal expansion. An auxiliary strength member may also be provided in the embodiment shown in FIG. 2. The auxiliary strength member 12 may continue across the slack of the carried member 6.

It will be realised that the degree of slack in the carried member 6 between its attachment points to adjacent spans of the strength member 3 needs to be sufficient to take up any elongation in the strength member due to environmental loading and/or any sliding of the tubular member 7 to an asymmetric position on the span. For convenience of installation, the carried member 6 may be provided in lengths, and the lengths connected by coupling with tube connectors 13 (FIG. 1). Where a "blown fibre" installation technique is used to install the transmission line in the carried member 6, it is important for the tube connectors 13 to form well-sealed joints to the members, so that leakage of the gas used for blowing is avoided. Of course, for short lengths, some leakage can generally be tolerated.

If the passageways constituting the tubular member 7 and the carried member 6 are formed integrally, such as by a plastics extrusion, separation, termination and relative shortening of the lengths of tubular member may be performed at the point of installation.

The tubular member 7 may be fixed relative to the strength member 3 at one end, or at some intermediate location, in order to control the direction of sliding, or to prevent unrestricted relative longitudinal sliding.

FIG. 4 shows a third embodiment of the invention in which each of the strength members', 31 is attached to one of the poles supporting the drop cable system via an elastic linkage, provided in this example by a helical spring 33. Conveniently, the spring 33 is attached to the pole via a ring mounting 34 to which an elastic linkage (spring) 33 of the next span or catenary length is also attached. Preferably, each catenary length of strength member 31 is provided with an elastic linkage 33 at each end. With this arrangement, when the drop cable is subjected to additional loading, the elastic linkages 33 extend and, as will be shown later, thereby enables reduction in the strain experienced in the cable. The carried member 32 for the transmission line (not shown) must be continuous, and so, where an elastic linkage 33 is attached to the adjacent strength member 31 (at point 53) the carried member is separated from the strength member (now constituted by the elastic linkage), and continues separately from the elastic linkage for a short distance until it rejoins the strength member after the elastic section. In the embodiment shown, the elastic linkage 33 at the end of the next adjacent catenary length is also bypassed in a continuous loop before the carried member 32 rejoins the strength member 31. An auxiliary strength member (not shown but similar to the member 12) may be provided in the carried member 32 to aid in its support between the two attachment points 53 of the elastic linkages 33 to the strength member 31. The loop of unsupported carried member 32 is provided with a degree of slack that is at least equal to the maximum extension that the elastic linkages 33 that it bridges will undergo.

The invention has been illustrated by the provision of elastic linkages 33 between the strength members 31 and the poles. This enables provision of two elastic linkages 33 for each catenary length, with minimum inconvenience, since the strength members 31 have, in any event, to be interrupted for secure connection to the poles. However, a more general principal of the invention is to provide an elastic linkage anywhere in the strength member, and for the carried member to be separated from the strength member for at least the length of the elastic linkage and provided with sufficient slack to accommodate the maximum expansion of the elastic linkage. Such an elastic linkage or linkages could be provided at any location in each catenary length.

In any external suspended drop cable system, there are initial loading and tension factors which are determined by the drop cable weight and the selected installation tension, and superimposed on this there are changes in loading due to factors such as ice and wind. It is established that the relationship in a catenary between the catenary drop (the maximum sag) D, the distance L between poles, the distributed load W per metre run on the drop cable, and the tension T in the drop cable can be expressed as:

$$D = L^2 W / 8T \quad (1)$$

from which it can be seen that the drop increases with pole separation and load, and decreases with tension. The principal of the present invention is to eliminate, or reduce, changes in the tension T by allowing an increase in the catenary drop D, in order to compensate for the additional loading which would affect W in the above equation.

While it is preferred to use the previously described drop cable together with the sprung catenary system, it is possible to use the sprung catenary system with a 'solid' drop cable of the type shown in FIG. 5. In such a drop cable, there is no freedom for relative movement between the strength member 3 and the surrounding plastics material. As before, the carried member 32 is intended for the installation of transmission lines by means of a 'blown fibre' technique, subsequent to installation of the drop cable. Consequently, the details given above with reference to the carried member 32 of the drop cables of FIGS. 1, 2 and 3, apply equally to the drop cable of FIG. 5.

The effectiveness of a resilient link in the strength member is now demonstrated numerically using the simple drop cable shown in FIG. 5 in the arrangement shown in FIG. 4. In the event that the drop cable is changed to a different design, or the installation tension or span length is changed, then the numerical values will change, and it may be necessary to make corresponding changes in the available extension in the elastic linkages.

For the purposes of calculating the maximum load on the cable, it is assumed that there is a 5 mm coating of ice over the surface of the cable, and that this ice-clad cable is subjected to a wind loading of 80 km/hr. It is further assumed that the entire load is borne by the strength member, and that the relationship of Young's Modulus= stress/strain holds for the tensile steel strength member.

In the drop cable of FIG. 5, the steel strength member has a cross-sectional area of 1.7671 mm². The total weight of the cable, including an installed fibre package, is 0.364 Newtons per metre run, and 5 mm of radial ice adds a weight of 1.98 Newtons per metre run to give a total ice clad weight of 2.344 Newtons per metre run. Using the factors and formulae for wind loading from Constrado, Publication 1/75 (1975), 'Wind forces on unclad tubular structures', the ice-clad cable presents an effective size of 0.015 m, and an 80 km/hr wind load provides a load of 5.438 Newtons per metre run.

$$\sqrt{(\text{ice clad weight}^2 + \text{wind load}^2)} =$$

$$\sqrt{(2.344^2 + 5.438^2)} = 5.92 \text{ Newtons per metre run}$$

For this purpose of the example, a maximum distributed load of this value, 5.92 Newtons per metre run, is now assumed.

In order to ascertain the required properties of the elastic linkage, it is necessary to find the required extension to increase the catenary drop sufficiently to keep the tension and hence the strain within acceptable limits.

Upon installation, i.e. under cable load only (no wind or ice), a catenary drop of 0.7 metres is an acceptable standard. Using this value in equation (1), with the cable weight of 0.364 Newtons per metre run for a span length of 68 metres provides:

$$0.7 = 68^2 \times 0.364 / 8T$$

which gives an installation tension T=300.56 Newtons. Using an iterative computer program, it can be demonstrated that, in order to support a distributed load of 5.92 Newtons assumed above, a tension of 1350 Newtons is required. Thus, the ice and wind load provides an increase in load of 1050 Newtons.

In the absence of any springs, using the relationship Youngs Modulus=stress/strain for the increase in tension in the strength member, a value of 160×10 Newtons per square mm for Young's Modulus for the tensile steel, and a cross-sectional area of 1.7671 square mm for the strength member gives:

strain=load/(area×Young's Modulus).

strain=1050/(1.7671×160×10³)=3.7137×10⁻³ .

Thus, the additional strain is 0.37% which is far in excess of that permissible for an optical fibre. Only the additional strain due to the ice and wind loading has been considered, as it has been assumed that the optical fibre was installed after suspension of the drop cable, and is therefore not subject to the drop cable installation tension of 300 Newtons.

If we take a maximum acceptable strain limit of 0.25% (which is in fact too high for optical fibres but serves to illustrate the point), then the maximum catenary length that is acceptable can be calculated.

The catenary length of the unloaded, installed cable is calculated first, since again it is only changes from that length that affect a subsequently-installed fibre.

Catenary length = L + (W² L³)/24 T²
installed catenary length =
68 + (0.344² × 68³)/(24 × 300²) = 68.0172 meters
A 0.25% elongation gives
68.0172 × 1.0025 = 68.1873 meters Thus, to support a 5.92 Newton per metre run distributed load with only a 0.25% strain increase, the following is known:

initial installation tension = 300 Newtons
distance between poles = 68 meters
distributed weight (under = 5.92 Newtons per meter run
maximum ice/wind loading)
permissible catenary length = 68.1873 meters
(calculated above)

The additional tension in a cable extended to its maximum permissible strain (0.25%) can be found using the relationship Youngs Modulus=stress/strain for the increase in strain, and substituting Tension=stress×area gives the relationship.

Tension=Youngs Modulus×strain×area and, using the values given earlier, this gives Tension=160×10³×0.0025×1.7671=706.84 Newtons In other words, a 0.25% strain limit only enables a maximum tension in the cable of 1006.84 Newtons (i.e. the installation tension of 300 Newtons plus the increase of 706.84 Newtons calculated above).

In order to reduce the tension from the previously calculated maximum tension of 1350 Newtons to the permissible tension of 1006.84 Newtons (so as not to exceed the 0.25% strain) the catenary length has to increase. This increase in length cannot be provided by the cable itself (as this would increase the strain), but is provided by the springs.

The catenary length required to reduce the tension sufficiently can be obtained from the relationship:

$$\text{catenary length} = L + \frac{W^2 L^3}{24\, T^2}$$

where
L=distance between poles
W=weight per metre run
T=tension
and, using the established values, this gives catenary $$\text{length} = 68 + \frac{5.92^2 \times 68^3}{24 \times 1006.84^2} = 68.4529$$

Thus, the required catenary length, in order to yield a maximum tension of 1006.84 Newtons for a 5.92 Newtons per metre run load, is 68.4529 metres.

The maximum length of the cable for 0.25% strain (which will support 1006.84 Newtons) is 68.1873 metres.

Therefore, the springs (or other elastic linkages) must provide an extension of the additional catenary length required, 68.4529−68.1873=0.2656 metres over a tension charge of 706.84 Newtons. If springs are provided at each end of each span, this yields a required rate of 5.31 N/mm for each spring.

It is, of course, possible to provide springs that would take up the installation strain in the event that the fibre was not subsequently installed, or for a different maximum strain. If the maximum strain is about half that allowed above, i.e. 0.125% for example, then the spring extension rate would need to be approximately doubled.

The embodiment described utilises a mechanical spring, but the elasticity may be provided by other means such as an elastic polymer material i.e. in the form of an entropy spring rather than an energy spring.

In FIG. 4 it will be observed that each spring 33 is connected to its attachment point 53 via a stopper member 36. Each stopper member 36 comprises a small diameter (for example 1 or 2 cm) helix with a comparatively long pitch length, so that the turns are extended and open.

The end of the drop cable strength member 31 from the drop cable is wound around the open turns of the helical stopper member 36 so that, under tension, the strength member pulls tightly against the turns of the stopper member and is secured therein. This type of securement of a strength member in a helical stopper member is well known in existing catenary systems. In order to aid gripping, the surface of the stopper member 36 may be coated with a high friction material such as carborundum powder or a PVC moulding. A progressive or distributed gripping action may be provided by having a varying diameter helix, with the turns tapering from a larger diameter at the end where the strength member 31 is introduced. The helical stopper member 36, in order to function to grip the drop cable strength member 31, must be comparatively rigid with respect to the strength member. In a particularly preferred embodiment of the invention, the stopper member 36 is formed integrally with the associated elastic linkage 33 (although it is possible to use a stopper member which is separate from, but connected to, an elastic linkage). It is possible for the same diameter of wire (for example standard 10 gauge) to form the rigid stopper member 36 by virtue of small diameter turns, and then be formed into substantially larger turns to provide the elastic linkage. It will be realised that, within the general context of the expression 'strength member', the stopper member and the elastic linkage will comprise, or constitute, the strength member by virtue of their attachment to, or continuation from, the drop cable strength member.

A further advantage of incorporating an elastic linkage, and one of general applicability, is that, upon initial installation, the spring should extend to an initial length corresponding to the desired installation tension (assuming installation is carried out without significant environmental loading), and is effectively a built-in tension gauge. This is particularly relevant where elastic linkages are used to reduce loading, since the calculation of the required spring rate assumes a given installation tension, and, if the installation tension differs, then the correct degree of tension relief may not be provided. However, the use of an elastic linkage purely as a tension gauge for use in installing other catenaries where tension relief is not necessary may also be useful.

We claim:

1. A drop cable arrangement for a catenary, the arrangement comprising:

a tensile-load-supporting strength member and a carried member;

an elastic linkage being provided in the strength member, the elastic linkage having an extension rate per unit length substantially greater than the extension rate of the strength member;

the carried member being decoupled from the strength member along substantially all of the carried member whereby limited but significant elongation of said strength member can occur without significant elongation of the carried member, the carried member being provided with sufficient slack to take up the extension of the elastic linkage without strain;

in which the elastic linkage is a spring provided at the end of a catenary length, and forming part of an attachment means for attaching the strength member to a supporting pole, the attachment means further comprising a helical stopper member, the spring being disposed between the helical stopper member and a supporting pole; and in which the spring is a helical spring formed integrally with the stopper member.

2. A drop cable arrangement for a catenary, the arrangement comprising:

a tensile-load-supporting strength member and a carried member;

an elastic linkage being provided in the strength member, the elastic linkage having an extension rate per unit length substantially greater than the extension rate of the strength member;

the carried member being decoupled from the strength member along substantially all of the carried member whereby limited but significant elongation of said strength member can occur without significant elongation of the carried member, the carried member being provided with sufficient slack to take up the extension of the elastic linkage without strain; and in which the or each elastic linkage provides an extension of at least 2.5 mm per Newton, over a catenary span.

3. A drop cable arrangement for a catenary, the arrangement comprising:

a tensile-load-supporting strength member and a carried member;

an elastic linkage being provided in the strength member, the elastic linkage having an extension rate per unit length substantially greater than the extension rate of the strength member;

the carried member being decoupled from the strength member along substantially all of the carried members whereby limited but significant elongation of said strength member can occur without significant elongation of the carried member, the carried member being provided with sufficient slack to take up the extension of the elastic linkage without strain;

a tubular member supporting the carried member; and in which the tubular member is provided with at least one vent or interruption to permit egress of water.

4. A drop cable arrangement for a catenary, the arrangement comprising:

a tensile-load-supporting strength member and a carried member;

an elastic linkage being provided in the strength member, the elastic linkage having an extension rate per unit length substantially greater than the extension rate of the strength member;

the carried member being decoupled from the strength member along substantially all of the carried member whereby limited but significant elongation of said strength member can occur without significant elongation of the carried member, the carried member being provided with sufficient slack to take up the extension of the elastic linkage without strain;

a tubular member supporting the carried member; and in which the tubular member is provided with an auxiliary strength member; and in which the auxiliary strength member is made of polyaramide.

5. A suspended cable arrangement comprising:

first and second supports, a continuous, elongate, tensile-load-carrying strength member extending between and secured to said supports, the strength member supporting a duct, suitable for use in a fibre blowing process, the strength member not being received within said duct, and said duct between said supports being decoupled from the strength member along substantially all of the strength member, whereby limited but significant elongation of said strength member can occur without significant elongation of said duct.

6. A cable arrangement as in claim 5 including three or more supports and wherein:

the duct provides a continuous path between all the supports, the duct diverges from the strength member at the support, an excess length of the duct being provided at the support, wherein the duct comprises plural discrete parts joined together in an end-to-end relationship, the joints between the parts being substantially gas tight.

7. A cable arrangement as in claim 5 wherein a tubular member loosely surrounds the strength member in a first cavity, the duct being formed as a second cavity distinct from the first, and the duct being supported by said strength member by means of said tubular member.

8. A cable arrangement as in claim 7 wherein the tubular member and the duct are each part of a one piece body of plastics material, the body of the duct being provided by plastics materials which is different that which provides the inner surface of the duct.

9. A cable arrangement as in claim 8 wherein the inner surface of the duct is provided by plastics material incorporating a lubricant.

10. A cable arrangement as in claim 9 wherein the lubricant is antistatic grade carbon.

11. A suspended cable arrangement comprising:

first and second supports, a continuous, elongate, tensile-load-carrying strength member extending between and secured to said supports, the strength member supporting a duct, suitable for use in a fibre blowing process and having a bore diameter in the range of 3 to 7 mm, the strength member not being received within said duct, and said duct between said supports being decoupled from the strength member along substantially all of said strength member, whereby limited but significant elongation of said strength member can occur without significant elongation of said duct.

12. A suspended cable arrangement comprising:

first and second supports, a continuous, elongate tensile-load-carrying strength member extending between and secured to said supports, the strength member supporting a duct, suitable for use in a fibre blowing process and having a bore diameter in the range of 3 to 7 mm, the strength member not being received within said duct, said duct being decoupled from the strength member along substantially all of said strength member, whereby limited elongation of said strength member can occur without significant elongation of said duct;

a tubular member loosely surrounding said strength member, the duct being supported by said strength member by means of said tubular member, and the tubular member and the duct each being part of a one-piece body of plastics material, the body of the duct being provided by a plastics material which is different from that which provides the inner surface of the duct.

13. A drop cable capable of being suspended from poles in a catenary, comprising:

a duct suitable for use in a fibre blowing process, means connected to or integral with said duct to engage with a continuous, elongate tensile-load-carrying strength member, said duct being decoupled from the strength member along substantially all of said strength member whereby limited elongation of said strength member can occur without significant elongation of said duct.

14. A drop cable as claimed in claim 13, wherein said means comprises a tubular member into which the strength member can be received.

15. A drop cable arrangement for blown installation of optical fibre thereinto, said arrangement comprising:

an elongated strength member which carries an elongated optical fibre duct in plural s pans disposed between successive elevated points, said fibre duct being suitable for blown fibre installation throughout the plural spans of an installed drop cable arrangement;

said strength member being mechanically decoupled from said fibre duct in the elongated longitudinal dimension along substantially all of said strength member so that changes in length of the strength member caused by changes in temperature and loading stress produce substantially less, if any, strain in the fibre duct; and said duct being routed around said elevated points with sufficient slack to accommodate changes in strength member length while remaining substantially gas-tight at any connection joint thereof between duct spans so as to remain suitable for blown fibre installation throughout the plural spans.

16. A method of installing optical fibre along a drop cable arrangement spanning plural vertical support points spaced apart over an extended path, said method comprising the steps of:

installing a drop cable along said extended path between said vertical support points, said drop cable having an elongated strength member carried by said vertical support points and, in turn, carrying an elongated optical fibre duct which is mechanically decoupled from the strength member in the longitudinal direction along said path along substantially all of said strength member so that changes in the length of the strength member caused by changes in temperature and loading stress produce substantially less, if any, strain in the fibre duct;

effecting gas-tight joints, if needed, in the duct which bypass the vertical support points, and thereafter installing an optical fibre transmission line into said duct along said path using blown fibre techniques that urge the fibre from one end of the duct using viscous friction between the fibre and faster moving gases along said duct.

17. A suspended cable arrangement comprising-first and second supports, a continuous, elongate, tensile-load-carrying strength member extending between and secured to the supports, the strength member supporting a duct suitable for use in a fibre blowing process, the strength member not being received within the duct, the duct between the supports being decoupled from the strength member along substantially all of its length, whereby limited but significant elongation of the strength member can occur without significant elongation of the duct, and wherein the duct comprises plastics materials, a body of the duct comprising a first plastics material, and an inner surface of the duct being provided by a second plastics material which is a polymer incorporating a solid lubricant.

18. A cable arrangement as claimed in claim 17 wherein there are three or more supports, the duct providing a continuous path between all the supports, the duct diverging from the strength member at the supports, and excess length of the duct being provided at the supports, wherein the duct comprises plural discrete parts joined together in an end-to-end relationship, the joints between the parts being substantially gas tight.

19. A cable arrangement as claimed in claim 17 wherein a tubular member loosely surrounds the strength member in a first cavity, the duct being formed as a second cavity distinct from the first, and the duct being supported by the strength member by means of the tubular member.

20. A cable arrangement as claimed in claim 19 wherein the tubular member and the duct are each part of a one piece body of plastics material, the body of the duct being provided by plastics material which is different from that which provides the inner surface of the duct.

21. A cable arrangement as claimed in claim 18 wherein the second plastics material is high density polyethylene.

22. A cable arrangement as claimed in claim 17 wherein the lubricant is an antistatic grade of carbon.

23. A drop cable arrangement comprising a duct suitable for use in a fibre blowing process, and means connected to or integral with the duct for engagement with a tensile-load-carrying strength member, said tensile-load-carrying strength member being decoupled from the duct along substantially all of its length wherein the duct comprises plastics materials, a body of the duct comprises a first plastics material and an inner surface of the duct is provided by a second plastics material, the second plastics material being a polymer incorporating a solid lubricant.

24. A drop cable arrangement as claimed in claim 23 wherein the second plastics material is high density polyethylene.

25. A cable arrangement as claimed in claim 23 wherein the solid lubricant is an anti-static grade of carbon.

26. A cable arrangement as claimed in claim 25, wehrein the concentration of carbon in the second plastics material is in the range 5 to 10 per cent.

27. A cable arrangement as claimed in claim 23 wherein the inner surface is provided by a lining having a thickness in the range 0.2 to 1 mm.

28. A drop cable arrangement for blown installation of optical fibre thereinto, the arrangement comprising:

an elongate strength member which carries an elongate optical fibre duct in plural spans disposed between successive elevated points, the fibre duct being suitable for in situ blown fibre installation throughout the plural spans of an installed drop cable arrangement;

said duct comprising plastics materials, a body of the duct comprising a first plastics material, and an inner surface of the duct being provided by a second plastics material which incorporates a solid lubricant;

said strength member being mechanically decoupled from the fibre duct in the elongated longitudinal dimension along substantially all of its length so that changes in length of the strength member caused by changes in temperature and loading stress produce substantially less, if any, strain in the fibre duct; and said duct being routed around the elevated points with sufficient slack to accommodate changes in strength member length while remaining substantially gas-tight at any connection joint thereof between duct spans so as to remain suitable for blown fibre installation throughout the plural spans.

29. A method of installing optical fibre along a drop cable arrangement spanning plural vertical support points spaced apart over an extended path, the method comprising the steps of:

installing a drop cable along the extended path between the vertical support points, the drop cable having an elongated strength member carried by the vertical support points and, in turn, carrying an elongated duct which is mechanically decoupled from the strength member in the longitudinal direction along substantially the entire length of the path so that changes in the length of the strength member caused by changes in temperature and loading stress produce substantially less, if any, strain in the fibre duct; said duct comprising plastics materials, a body of the duct comprising a first plastics material, and an inner surface of the duct being provided by a second plastics material which incorporates a solid lubricant;

effecting gas-tight joints, if needed, in the duct which bypass the vertical support points; and thereafter installing an optical fibre transmission line into the duct along the path using blown fibre techniques such that the fibre is propelled from one end of the duct using viscous friction between the fibre and faster moving gases along the duct.

* * * * *